United States Patent
Wang et al.

(10) Patent No.: US 12,128,464 B2
(45) Date of Patent: Oct. 29, 2024

(54) CORRUGATED-FLAT ROLLING COMPOSITE METHOD FOR STEEL/ALUMINUM/ALUMINUM ALLOY LAMINATED COMPOSITE PLATES

(71) Applicant: Taiyuan University of Technology, Taiyuan (CN)

(72) Inventors: Tao Wang, Taiyuan (CN); Yu Chen, Ji'an (CN); Wenwen Liu, Taiyuan (CN); Ke Chen, Taiyuan (CN); Ting Li, Hongtong County (CN); Qingxue Huang, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 14 days.

(21) Appl. No.: 17/289,367

(22) PCT Filed: Oct. 14, 2020

(86) PCT No.: PCT/CN2020/120775
§ 371 (c)(1),
(2) Date: Apr. 28, 2021

(87) PCT Pub. No.: WO2022/036823
PCT Pub. Date: Feb. 24, 2022

(65) Prior Publication Data
US 2024/0246130 A1 Jul. 25, 2024

(30) Foreign Application Priority Data
Aug. 19, 2020 (CN) .......................... 202010835629.3

(51) Int. Cl.
*B21B 1/38* (2006.01)
*B23K 20/00* (2006.01)
(Continued)

(52) U.S. Cl.
CPC ................ *B21B 1/38* (2013.01); *B23K 20/00* (2013.01); *B23K 20/04* (2013.01); *B23P 15/00* (2013.01); *B21B 2001/386* (2013.01)

(58) Field of Classification Search
CPC ..... B21B 1/38; B21B 2001/386; B21B 47/00; B21B 47/02; B23K 20/00; B23K 20/04; B23P 15/00; B21C 37/02
See application file for complete search history.

(56) References Cited

U.S. PATENT DOCUMENTS 10,799,976 B2 * 10/2020 Faruque ............... B62D 25/105

FOREIGN PATENT DOCUMENTS

| CN | 108672494 A | * | 10/2018 | ............... B21B 1/38 |
| CN | 109731912 A | * | 5/2019 | |
| WO | WO-2009079700 A1 | * | 7/2009 | ............... B22F 3/18 |

* cited by examiner

*Primary Examiner* — Bayan Salone

(57) ABSTRACT

Disclosed is a corrugated-flat rolling composite method for a steel/aluminum/aluminum alloy laminated composite plate. According to the method, a steel/aluminum laminated composite plate with a good plate shape and a firmly bonded interface is prepared, the corrugated cold rolling with a large thickness ratio is utilized to enhance the deformation of the interface to be bonded, and the deformation of constituent metals is coordinated to solve the problem that the steel-aluminum interface is not deformed. Then the deformation of constituents is coordinated by the interfacial corrugated-flat hot rolling to achieve the bonding of aluminum and aluminum alloy surfaces and prepare a high-performance steel/aluminum/aluminum alloy laminated composite plate. Taking the advantage that the interface oxidation has little effect on the bonding of aluminum and aluminum alloy, the problem of anti-oxidation in the composite process is eliminated, thereby the problem of low interfacial bonding strength is solved due to a fact that the interfacial shear (Continued)

becomes weak and the interfacial bonding mainly depends on the hot-press action when the steel and aluminum bonding surface approaches the neutral layer in the rolling process of a steel/aluminum/aluminum alloy laminated composite plate with a thickness more than 4 mm, and the problem of uncoordinated deformation is solved due to the large difference in the properties of steel, aluminum and aluminum alloy.

10 Claims, 3 Drawing Sheets

(51) Int. Cl.
     *B23K 20/04*      (2006.01)
     *B23P 15/00*      (2006.01)

Corrugated cold-rolled specimen     Hot-rolled blank assembling method     Hot-rolled specimen Peak interface          Trough interface // CORRUGATED-FLAT ROLLING COMPOSITE METHOD FOR STEEL/ALUMINUM/ALUMINUM ALLOY LAMINATED COMPOSITE PLATES

CROSS REFERENCE TO RELATED APPLICATION

The invention relate to the technical field of preparation of metal laminated composite plates, in particular to a corrugated-flat rolling composite method for steel/aluminum/aluminum alloy laminated composite plates.

BACKGROUND OF THE INVENTION

In the construction of large ships, the main hull is of the steel structure, and the superstructure and deckhouse are of the aluminum alloy structure to reduce the center of gravity of the ship, reduce the ship weight, improve the sailing speed and increase the sailing stability. In this case, the connection between steel structure and aluminum alloy structure is the core problem of ship construction. At present, steel structure and aluminum alloy structure are connected mainly by steel-aluminum transition joints in the process of ship construction at home and abroad. The transition joints are core components for ship construction, making their preparation technology become a core technology for material preparation of ships. With the increasing application of aluminum and aluminum alloy structural parts to large ships, the preparation technology of high-performance steel-aluminum transition joints has been widely concerned.

Steel-aluminum transition joints are mainly classified into steel-titanium-aluminum alloy transition joints and steel-aluminum-aluminum alloy transition joints. From the perspective of meeting the structural strength of ships, steel-aluminum-aluminum alloy transition joints are economically more advantageous than steel-titanium-aluminum alloy transition joints.

The steel-aluminum-aluminum alloy transition joints currently used around the world mainly refer to a laminated composite plate prepared by the explosion cladding method and processed into strips, plates, circles or other shapes by cold working methods such as sawing, planning, milling and water jet cutting. However, the steel-aluminum-aluminum alloy transition joint prepared by the explosion cladding method is limited in length and has to be butt-welded in use; moreover, the interfacial mechanical property of such a transition joint is highly thermo-sensitive (e.g. in order to ensure quality, the U.S. Army specifies that the interface temperature is not more than 400° F. in the welding process), making it difficult to butt-weld and ensure post-weld performance. In addition, with the advantages of stable quality, simple equipment, scale production and automated production, the rolling composite method is more suitable than the explosion cladding method for preparing a laminated composite plate. Due to environmental and safety problems, the explosion cladding method has been prohibited throughout Japan and the calendering process is used instead. But, when the thickness of a steel/aluminum/aluminum alloy laminated composite plate exceeds 4 mm, especially when the total thickness exceeds 10 mm and the steel thickness exceeds 5 mm, due to the large difference between constituent metals, the composite plate is prone to interface oxidation, uncoordinated deformation of constituents, small interfacial deformation and low bonding strength in the rolling bonding process, leading to the failure of continuous rolling preparation of a high-performance steel/aluminum laminated composite plate. Therefore, there is an urgent need to develop a new method for the continuous preparation of a high-performance heavy-gauge steel/aluminum/aluminum alloy laminated composite plate.

SUMMARY OF THE INVENTION

To solve the problems of uncoordinated deformation of constituents, interfacial oxidation, and low bonding strength during the preparation of a steel/aluminum/aluminum alloy laminated composite plate with a thickness more than 4 mm, the invention provides a corrugated-flat rolling composite method of a high-performance steel/aluminum/aluminum alloy laminated composite plate.

To achieve the above purpose, the invention provides a solution that a corrugated-flat rolling composite method for steel/aluminum/aluminum alloy laminated composite plates, comprising the following steps:
1) blank preparation: providing a steel plate and an aluminum plate, heat treating the steel plate and the aluminum plate respectively, removing oil stains and oxidation films on the surfaces of the steel plate and the aluminum plate, rough grinding the surfaces to be bonded of the steel plate and the aluminum plate, and then letting stand and drying;
2) preparation of steel/aluminum assembled blank: stacking the steel plate and the aluminum plate treated in the step 1) together so that the surfaces to be bonded are in contact, folding length side and width side of the aluminum plate to wrap the steel plate, binding the head and tail with aluminum wires to obtain a two-layer assembled blank;
3) preparation of steel/aluminum laminated composite plate: cold rolling the two-layer assembled blank prepared in the step 2) by a corrugated mill with a corrugated roll as an upper roll and a flat roll as a lower roll, and allowing the corrugated roll to be in contact with the aluminum plate and the flat roll to be in contact with the steel plate to prepare a steel/aluminum laminated composite plate with a corrugated surface on the aluminum side;
4) preparation of steel/aluminum/aluminum alloy assembled blank with corrugated-flat interface: providing an aluminum alloy plate with the same length and width as the steel/aluminum laminated composite plate prepared in the step 3), stacking the aluminum alloy plate and the steel/aluminum laminated composite plate together so that the surface to be bonded of the aluminum alloy plate is in contact with the corrugated surface of the aluminum side of the steel/aluminum laminated composite plate, and binding the head and tail with aluminum wires to form a steel/aluminum/aluminum alloy assembled blank with a corrugated-flat interface;
5) preparation of steel/aluminum/aluminum alloy laminated composite plate: heating the steel/aluminum/aluminum alloy assembled blank with a corrugated-flat interface prepared in the step 4), roll forming the steel/aluminum/aluminum alloy assembled blank with a corrugated-flat interface by using a flat-roll hot rolling mill, annealing, straightening and trimming sequentially to prepare a high-performance steel/aluminum/aluminum alloy laminated composite plate.

Preferably, in the step 1), the steel plate is any one of plain carbon steel, steel for ship and marine engineering and stainless steel, with a thickness of 4-100 mm; the aluminum plate is industrial pure aluminum, with a thickness of 0.2-8 mm; and the thickness ratio of steel to aluminum is greater than 8.

Preferably, the heat treatment temperature of the aluminum plate is 300-600° C. in the step 1).

Preferably, in the step 2), the symmetry planes formed by the length and width of the steel plate and the aluminum plate respectively are overlapped, the aluminum plate is wider than the steel plate by 2 h or more, and the aluminum plate is longer than the steel plate by 2 h or more, where h is the thickness of the steel plate.

Preferably, in the step 3), the corrugation of the corrugated roll is a sine/cosine curve, the ratio of corrugated height H to corrugated width B is 1:1-1:10, and the corrugated height H is not more than 10 mm.

Preferably, the rolling reduction is not less than 1 H in the step 3).

Preferably, the following steps are performed before the stacking of the aluminum alloy plate and the steel/aluminum laminated composite plate in the step 4): allowing the corrugated surface of the aluminum side of the steel/aluminum laminated composite plate and the aluminum alloy plate to be subjected to surface treatment; removing oil stain and oxidation film on the corrugated surface of the aluminum side of the steel/aluminum laminated composite plate, then grinding, letting stand and drying; removing oil stain and oxidation film on the surface to be bonded of the aluminum alloy plate, then grinding, letting stand and drying.

Preferably, in the step 4), the designation of the aluminum alloy is any one of 3-series, 5-series or 6-series aluminum alloys, with a thickness of 4-100 mm.

Preferably, the heating temperature is 450-600° C. and the rolling reduction rate is not less than 40% in the step 5).

Preferably, the steel/aluminum/aluminum alloy laminated composite plate prepared in the step 5) is a high-performance composite plate with a mechanically engaged and metallurgically bonded corrugated interface.

The invention discloses the following technical effects:
1. According to the invention, corrugated cold rolling with a large thickness ratio is utilized to enhance the deformation of the interface to be bonded, and the deformation of constituent metals is coordinated to solve the problem that the steel-aluminum interface is not deformed. Firstly, a steel/aluminum laminated composite plate with a good plate shape and a firmly bonded interface is prepared; then, the deformation of constituents is coordinated by the interfacial corrugated-flat hot rolling to achieve the bonding of aluminum and aluminum alloy surfaces and a high-performance steel/aluminum/aluminum alloy laminated composite plate is prepared; and the interfacial bonding strength of steel and aluminum is further enhanced by the interface diffusion between steel and aluminum during hot rolling and the pressure during hot rolling.
2. Taking the advantage that the interface oxidation has little effect on the bonding of aluminum and aluminum alloy, the problem of anti-oxidation in the composite process is eliminated, thereby the problem of low interfacial bonding strength is solved due to a fact that the interfacial shear becomes weak and the interfacial bonding mainly depends on the hot-press action when the steel and aluminum bonding surface approaches the neutral layer in the rolling process of a steel/aluminum/aluminum alloy laminated composite plate with a thickness more than 4 mm, and the problem of uncoordinated deformation is solved due to the large difference in the properties of steel, aluminum and aluminum alloy.
3. According to the preparation method provided by the invention, the required equipment is simple, the modification is convenient, and continuous and large-scale production can be achieved.

BRIEF DESCRIPTION OF THE DRAWINGS

In order to explain more clearly the embodiments in the invention or the technical solutions in the prior art, the following will briefly introduce the drawings needed in the description of the embodiments. Obviously, drawings in the following description are only some embodiments of the invention, and for a person skilled in the art, other drawings may also be obtained based on these drawings without paying any creative effort.

Figure 1:
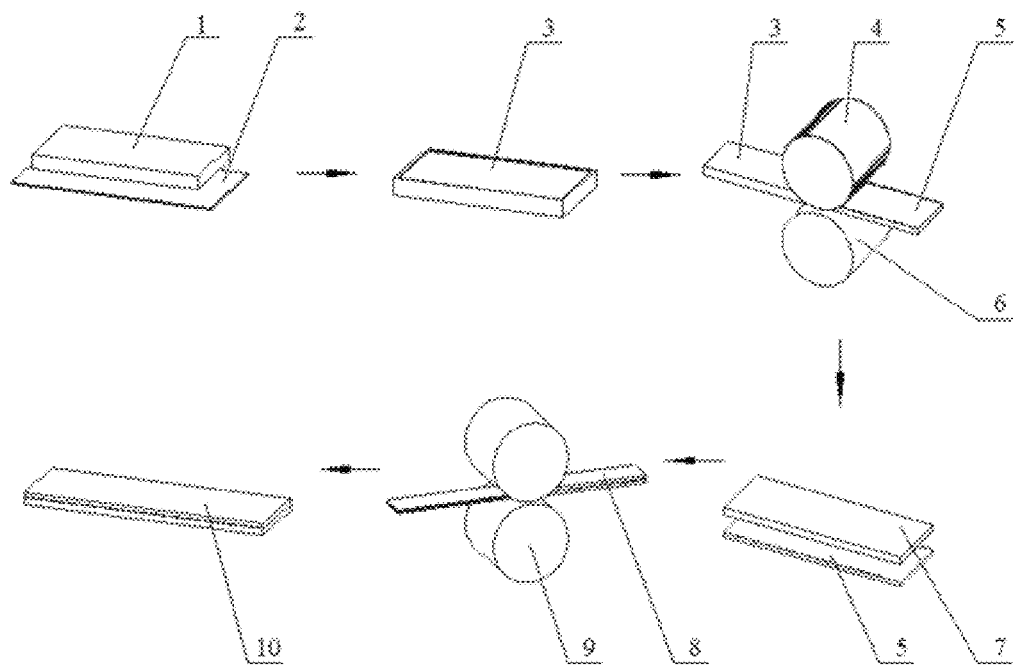
FIG. 1 is a rolling flow chart of the invention.
Figure 2:
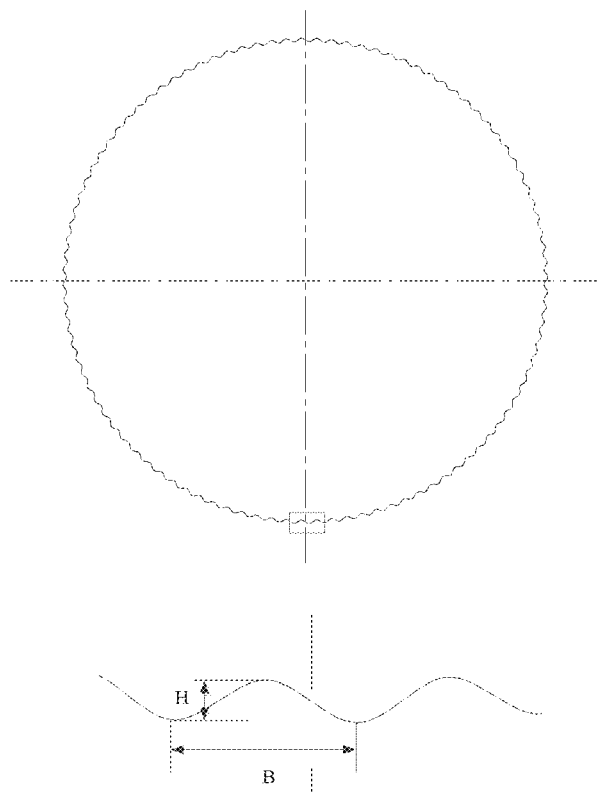
FIG. 2 is a plan view of a corrugated roll of a corrugated mill.
Figure 3:
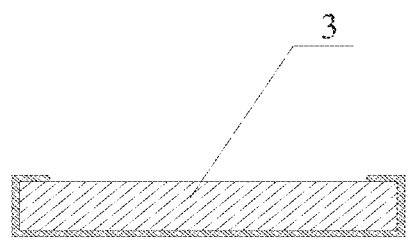
FIG. 3 is a sectional view of a steel/aluminum assembled blank in the width direction.
Figure 4:
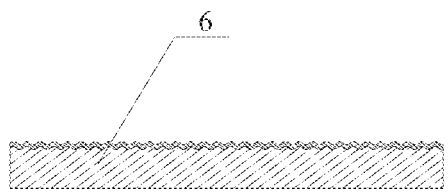
FIG. 4 is a sectional view of a steel/aluminum laminated composite plate in the rolling direction.
Figure 5:
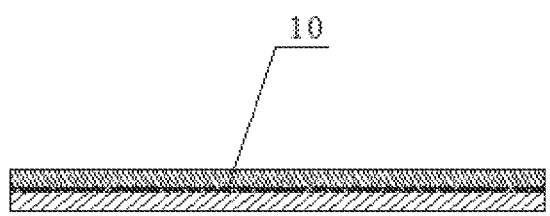
FIG. 5 is a sectional view of a steel/aluminum/aluminum alloy laminated composite plate in the rolling direction.
Figure 6:
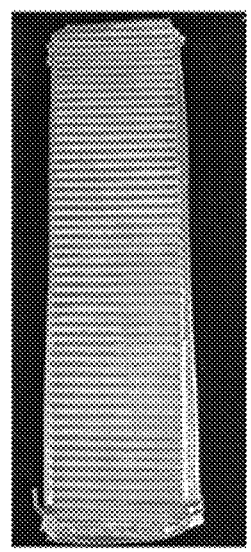
FIG. 6 shows corrugated cold-rolled specimen, blank assembling method and hot-rolled specimen in Example 2.
Figure 6:
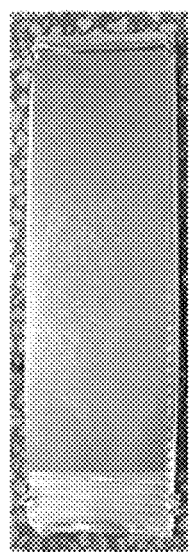
Figure 6:
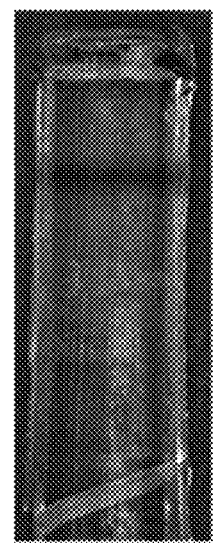
Figure 7:
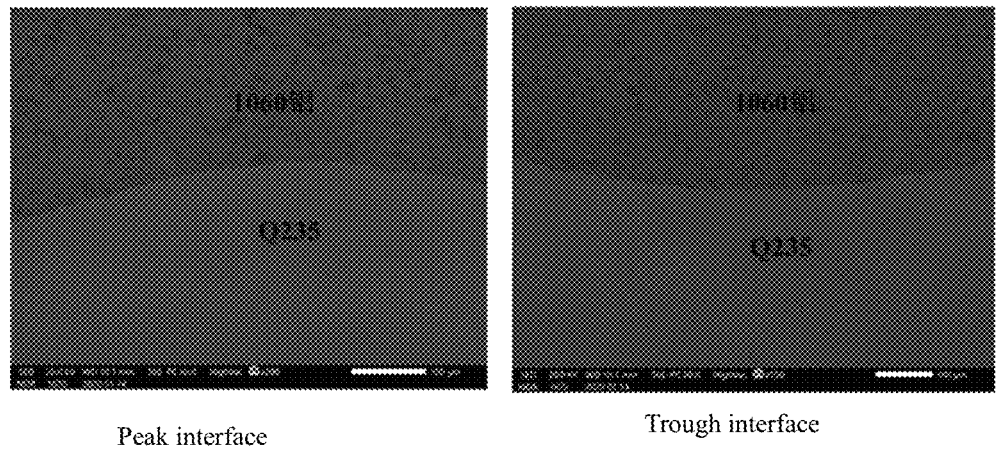
FIG. 7 shows the post-rolling interface morphology in Example 2.
Figure 8:
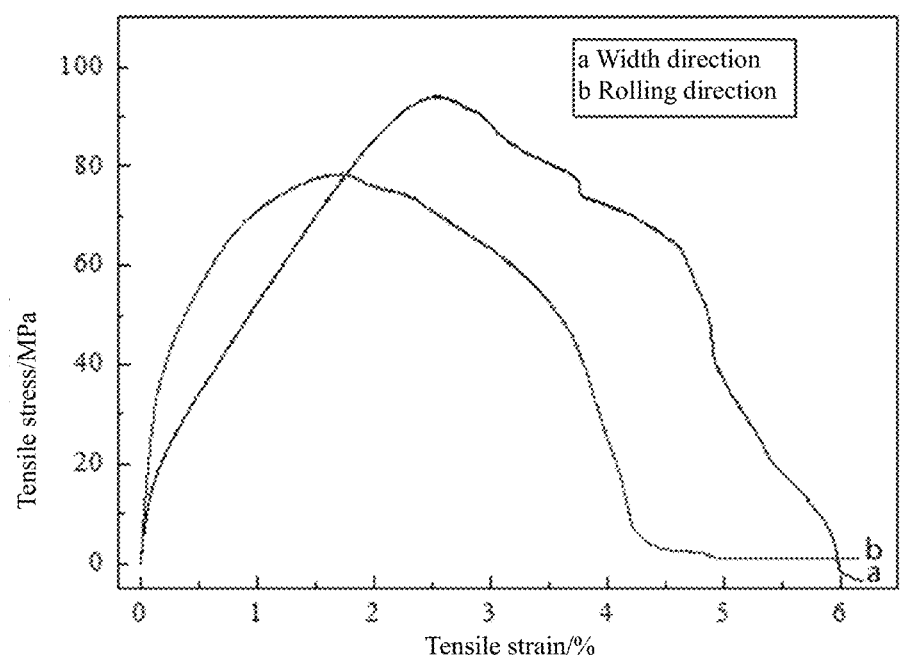
FIG. 8 shows the interfacial shear stress in the rolling direction and width direction in Example 2.

In the drawings: 1: steel plate, 2: aluminum plate, 3: steel/aluminum assembled blank, 4 corrugated roll of corrugated mill, 5 steel/aluminum laminated composite plate, 6: flat roll of corrugated mill, 7: aluminum alloy plate, 8: steel/aluminum/aluminum alloy assembled blank with corrugated-flat interface, 9: flat rolling mill, 10: steel/aluminum/aluminum alloy laminated composite plate.

DETAILED DESCRIPTION OF THE PREFERRED EMBODIMENTS

The technical solution in the embodiments of the invention will be described clearly and completely with reference to the drawings in the embodiments of the invention. Obviously, the embodiments described are only a part of the embodiments of the invention and not all of them. All other embodiments obtained by those of ordinary skill in the art without creative efforts shall fall within the scope of protection of the invention.

The invention will be further described in detail with reference to accompanying drawings and preferred embodiments for clear understanding of the above purpose, features and advantages of the invention.

Example 1

Example 1 provided a corrugated-flat rolling composite method for a steel/aluminum/aluminum alloy laminated composite plate. The method was used for preparing Q235B/1060/3003 laminated composite plate and specifically comprised the following steps:
1) providing and treating a steel plate 1 and an aluminum plate 2:

providing a steel plate 1 (L×W×H: 4000 mm×500 mm×10 mm, designation: Q235B), annealing the steel plate 1 at 600° C. for 2 h, air cooling, removing oil stain and oxidation film on the surface to be bonded of the steel plate 1, cleaning the surface to be bonded of the steel plate 1 with acetone and alcohol, grinding the surface to be bonded of the steel plate 1 by a grinder, with the surface roughness of Ra25, letting stand and drying; providing an industrial pure aluminum (L×W×H: 4030 mm×530 mm×0.2 mm, designation: 1060) as an aluminum plate 2, annealing the aluminum plate 2 at 300° C. for 2 h, air cooling, removing oil stain and oxidation film on the surface to be bonded of the aluminum plate 2, cleaning the surface to be bonded of the aluminum plate 2 with acetone and alcohol, grinding the surface to be bonded of the aluminum plate 2 by a grinder, with the surface roughness of Ra25, letting stand and drying.

2) stacking the treated steel plate 1 and aluminum plate 2 together so that the surfaces to be bonded are in contact, allowing the symmetry planes formed by the length and width of the steel plate 1 and the aluminum plate 2 respectively to be overlapped, folding length side and width side of the aluminum plate 2 to wrap the steel plate 1, and binding the head and tail with aluminum wires to obtain a steel/aluminum assembled blank 3.

3) cold rolling the steel/aluminum assembled blank 3 by a corrugated mill with a corrugated roll 4 as an upper roll and a flat roll 6 as a lower roll; and allowing the corrugated roll 4 to be in contact with the aluminum plate 2 and the flat roll 6 to be in contact with the steel plate 1 (the corrugated roll 4 has a corrugated height H of 1 mm, a width B of 1 mm and an average cold rolling reduction of 2 mm) to prepare a steel/aluminum laminated composite plate 5 with a corrugated surface on the aluminum side.

4) providing an aluminum alloy plate 7, treating the prepared steel/aluminum laminated composite plate 5 and aluminum alloy plate 7, and assembling to obtain a steel/aluminum/aluminum alloy assembled blank 8 with a corrugated-flat interface: selecting an aluminum alloy plate 7 (L×W×H: 4800 mm×510 mm×10 mm, designation: 3003), stress relief annealing the aluminum alloy plate 7 at 280° C. for 2 h, removing oil stain and oxidation film on the surface to be bonded, cleaning the surface to be bonded with alcohol and acetone, grinding by a grinder, with the surface roughness of Ra25, letting stand and drying; removing oil stain and oxidation film on the aluminum surface of the steel/aluminum laminated composite plate 5, cleaning the aluminum surface of the steel/aluminum laminated composite plate 5 with acetone and alcohol, grinding the aluminum surface of the steel/aluminum laminated composite plate 5 by a grinder, with the surface roughness of Ra25, letting stand and drying; stacking the treated aluminum alloy plate 7 and steel/aluminum laminated composite plate 5 together so that the surface to be bonded of the aluminum alloy plate 7 is in contact with the corrugated surface of the aluminum side of the steel/aluminum laminated composite plate 5, and binding the head and tail with aluminum wires to form a steel/aluminum/aluminum alloy assembled blank 8 with a corrugated-flat interface.

5) heating the steel/aluminum/aluminum alloy assembled blank 8 with a corrugated-flat interface, roll forming the steel/aluminum/aluminum alloy assembled blank 8 with a corrugated-flat interface with a rolling reduction rate of 40% by a flat rolling mill 9, and then annealing, straightening and trimming sequentially to prepare a high-performance steel/aluminum/aluminum alloy laminated composite plate 10 with a mechanically engaged and metallurgically bonded interface.

Example 2

Example 2 provided a corrugated-flat rolling composite method of a steel/aluminum/aluminum alloy laminated composite plate. The method is used for preparing Q235/1060/5083 laminated composite plate and specifically comprised the following steps:

1) providing and treating a steel plate 1 and an aluminum plate 2:

providing a steel plate 1 (L×W×H: 200 mm×60 mm×4 mm, designation: Q235), annealing the steel plate 1 at 600° C. for 2 h, air cooling, removing oil stain and oxidation film on the surface to be bonded of the steel plate 1, cleaning the surface to be bonded of the steel plate 1 with acetone and alcohol, grinding the surface to be bonded of the steel plate 1 by a grinder, with the surface roughness of Ra50, letting stand and drying; providing an industrial pure aluminum (L×W×H: 210 mm×70 mm×0.5 mm, designation: 1060) as an aluminum plate 2, annealing the aluminum plate 2 at 500° C. for 2 h, air cooling, removing oil stain and oxidation film on the surface to be bonded of the aluminum plate 2, cleaning the surface to be bonded of aluminum plate 2 with acetone and alcohol, grinding the surface to be bonded of the aluminum plate 2 by a grinder, with the surface roughness of Ra50, letting stand and drying.

2) stacking the treated steel plate 1 and aluminum plate 2 together so that the surfaces to be bonded are in contact, allowing the symmetry planes formed by the length and width of the steel plate 1 and the aluminum plate 2 respectively to be overlapped, folding length side and width side of the aluminum plate 2 to wrap the steel plate 1, and binding the head and tail with aluminum wires to obtain a steel/aluminum assembled blank 3.

3) cold rolling the steel/aluminum assembled blank 3 by a corrugated mill with a corrugated roll 4 as an upper roll and a flat roll 6 as a lower roll; and allowing the corrugated roll 4 to be in contact with the aluminum plate 2 and the flat roll 6 to be in contact with the steel plate 1 (the corrugated roll 4 has a corrugated height H of 1.1 mm, a width B of 5 mm and an average cold rolling reduction of 1.1 mm) to prepare a steel/aluminum laminated composite plate 5 with a corrugated surface on the aluminum side.

4) providing an aluminum alloy plate 7, treating the prepared steel/aluminum laminated composite plate 5 and aluminum alloy plate 7, and assembling to obtain a steel/aluminum/aluminum alloy assembled blank 8 with a corrugated-flat interface: selecting an aluminum alloy plate 7 (L×W×H: 240 mm 65×mm×4 mm, designation: 5083), stress relief annealing the aluminum alloy plate 7 at 280° C. for 2 h, removing oil stain and oxidation film on the surface to be bonded, cleaning the surface to be bonded with alcohol and acetone, grinding by a grinder, with the surface roughness of Ra50, letting stand and drying; removing oil stain and oxidation film on the aluminum surface of the steel/aluminum laminated composite plate 5, cleaning the aluminum surface of the steel/aluminum laminated composite plate 5 with acetone and alcohol, grinding the aluminum surface of the steel/aluminum laminated composite plate 5 by a grinder, with the surface roughness of Ra50, letting stand and drying; stacking the treated aluminum alloy plate 7 and steel/aluminum laminated composite plate 5 together so that the surface to be bonded of the aluminum alloy plate 7 is in contact with the corrugated surface of the aluminum side of the steel/aluminum laminated composite plate 5, and binding the head and tail with aluminum wires to form a steel/aluminum/aluminum alloy assembled blank 8 with a corrugated-flat interface.

5) heating the steel/aluminum/aluminum alloy assembled blank 8 with a corrugated-flat interface, and roll forming the steel/aluminum/aluminum alloy assembled blank 8 with a corrugated-flat interface with a rolling reduction rate of 45% by a flat rolling mill 9 to prepare a high-performance steel/aluminum/aluminum alloy laminated composite plate 10 with a mechanically engaged and metallurgically bonded interface. The interfacial shear stress test of the steel/aluminum/aluminum alloy laminated composite plate 10 showed that the shear stress in rolling direction reached 78.49 MPa and the shear stress in width direction reached 94.11 MPa, which were much higher than the strength requirement of 55 MPa in CB20091-2012.

Example 3

Example 3 provided a corrugated-flat rolling composite method of a steel/aluminum/aluminum alloy laminated composite plate. The method is used for preparing 304/1060/6061 laminated composite plate and specifically comprised the following steps:

1) providing and treating a steel plate 1 and an aluminum plate 2:
providing a steel plate 1 (L×W×H: 12000 mm×600 mm×100 mm, designation: 304), annealing the steel plate 1 at 600° C. for 2 h, air cooling, removing oil stain and oxidation film on the surface to be bonded of the steel plate 1, cleaning the surface to be bonded with acetone and alcohol of the steel plate 1, grinding the surface to be bonded of the steel plate 1 by a grinder, with the surface roughness of Ra50, letting stand and drying; providing an industrial pure aluminum (L×W×H: 12300 mm×800 mm×8 mm, designation: 1060) as an aluminum plate 2, annealing the aluminum plate 2 at 600° C. for 2 h, air cooling, removing oil stain and oxidation film on the surface to be bonded of the aluminum plate 2, cleaning the surface to be bonded of aluminum plate 2 with acetone and alcohol, grinding the surface to be bonded of the aluminum plate 2 by a grinder, with the surface roughness of Ra50, letting stand and drying.

2) stacking the treated steel plate 1 and aluminum plate 2 together so that the surfaces to be bonded are in contact, allowing the symmetry planes formed by the length and width of the steel plate 1 and the aluminum plate 2 respectively to be overlapped, folding length side and width side of the aluminum plate 2 to wrap the steel plate 1, and binding the head and tail with aluminum wires to obtain a steel/aluminum assembled blank 3.

3) cold rolling the steel/aluminum assembled blank 3 by a corrugated mill with a corrugated roll 4 as an upper roll and a flat roll 6 as a lower roll; and allowing the corrugated roll 4 to be in contact with the aluminum plate 2 and the flat roll 6 to be in contact with the steel plate 1 (the corrugated roll 4 has a corrugated height H of 10 mm, a width B of 100 mm and an average cold rolling reduction of 20 mm) to prepare a steel/aluminum laminated composite plate 5 with a corrugated surface on the aluminum side.

4) providing an aluminum alloy plate 7, treating the prepared steel/aluminum laminated composite plate 5 and aluminum alloy plate 7, and assembling to obtain a steel/aluminum/aluminum alloy assembled blank 8 with a corrugated-flat interface: selecting an aluminum alloy plate 7 (L×W×H: 14500 mm×620 mm×100 mm, designation: 6061), stress relief annealing the aluminum alloy plate 7 at 280° C. for 2 h, removing oil stain and oxidation film on the surface to be bonded, cleaning the surface to be bonded with alcohol and acetone, grinding by a grinder, with the surface roughness of Ra50, letting stand and drying; removing oil stain and oxidation film on the aluminum surface of the steel/aluminum laminated composite plate 5, cleaning the aluminum surface of the steel/aluminum laminated composite plate 5 with acetone and alcohol, grinding the aluminum surface of the steel/aluminum laminated composite plate 5 by a grinder, with the surface roughness of Ra50, letting stand and drying; stacking the treated aluminum alloy plate 7 and steel/aluminum laminated composite plate 5 together so that the surface to be bonded of the aluminum alloy plate 7 is in contact with the corrugated surface of the aluminum side of the steel/aluminum laminated composite plate 5, and binding the head and tail with aluminum wires to form a steel/aluminum/aluminum alloy assembled blank 8 with a corrugated-flat interface.

5) heating the steel/aluminum/aluminum alloy assembled blank 8 with a corrugated-flat interface, roll forming the steel/aluminum/aluminum alloy assembled blank 8 with a corrugated-flat interface with a rolling reduction rate of 40% by a flat rolling mill 9, and then annealing, straightening and trimming to prepare a high-performance steel/aluminum/aluminum alloy laminated composite plate 10 with a mechanically engaged and metallurgically bonded interface.

In the description of the invention, it should be understood that the terms "longitudinal", "transverse", "up", "down", "front", "back", "left", "right", "vertical", "horizontal", "top", "bottom", "inside" and "outside" indicate the orientation or positional relationship shown in the drawings, which are merely for the convenience of the description of the invention, and are not intended to indicate or imply that the device or component referred to has a specific orientation, and is constructed and operated in a specific orientation; and therefore they cannot be constructed as limiting the invention. The preferred embodiments described herein are only for illustration purpose, and are not intended to limit the invention. Various modifications and improvements on the technical solution of the invention made by those of ordinary skill in the art without departing from the design spirit of the invention shall fall within the scope of protection as claimed in claims of the invention.

What is claimed is:

1. A corrugated-flat rolling composite method of a steel/aluminum/aluminum alloy laminated composite plate, comprising the following steps:
  1) blank preparation: providing a steel plate and an aluminum plate, heat treating the steel plate and the aluminum plate respectively, removing oil stains and oxidation films on the surfaces of the steel plate and the aluminum plate, rough grinding the surfaces to be bonded of the steel plate and the aluminum plate, and then letting stand and drying;

2) preparation of steel/aluminum assembled blank: stacking the steel plate and the aluminum plate treated in the step 1) together so that the surfaces to be bonded are in contact, folding length side and width side of the aluminum plate to wrap the steel plate, binding the head and tail with aluminum wires to obtain a two-layer assembled blank;

3) preparation of steel/aluminum laminated composite plate: cold rolling the two-layer assembled blank prepared in the step 2) by a corrugated mill with a corrugated roll as an upper roll and a flat roll as a lower roll, and allowing the corrugated roll to be in contact with the aluminum plate and the flat roll to be in contact with the steel plate to prepare a steel/aluminum laminated composite plate having a corrugated surface on the aluminum side;

4) preparation of steel/aluminum/aluminum alloy assembled blank with corrugated-flat interface: providing an aluminum alloy plate with the same length and width as the steel/aluminum laminated composite plate prepared in the step 3), stacking the aluminum alloy plate and the steel/aluminum laminated composite plate together so that the surface to be bonded of the aluminum alloy plate is in contact with the corrugated surface of the aluminum side of the steel/aluminum laminated composite plate, and binding the head and tail with aluminum wires to form a steel/aluminum/aluminum alloy assembled blank with a corrugated-flat interface;

5) preparation of steel/aluminum/aluminum alloy laminated composite plate: heating the steel/aluminum/aluminum alloy assembled blank with a corrugated-flat interface prepared in the step 4), roll forming the steel/aluminum/aluminum alloy assembled blank with a corrugated-flat interface by using a flat-roll hot rolling mill, annealing, straightening and trimming sequentially to prepare a high-performance steel/aluminum/aluminum alloy laminated composite plate.

2. The corrugated-flat rolling composite method of a steel/aluminum/aluminum alloy laminated composite plate as claimed in claim 1, wherein in the step 1), the steel plate is any one of plain carbon steel, steel for ship and marine engineering and stainless steel, with a thickness of 4-100 mm; the aluminum plate is industrial pure aluminum, with a thickness of 0.2-8 mm; and the thickness ratio of steel to aluminum is greater than 8.

3. The corrugated-flat rolling composite method of a steel/aluminum/aluminum alloy laminated composite plate as claimed in claim 1, wherein the heat treatment temperature of the aluminum plate is 300-600° C. in the step 1).

4. The corrugated-flat rolling composite method of a steel/aluminum/aluminum alloy laminated composite plate as claimed in claim 1, wherein in the step 2), the symmetry planes formed by the length and width of the steel plate and the aluminum plate respectively are overlapped, the aluminum plate is wider than the steel plate by 2 h or more, and the aluminum plate is longer than the steel plate by 2 h or more, where h is the thickness of the steel plate.

5. The corrugated-flat rolling composite method of a steel/aluminum/aluminum alloy laminated composite plate as claimed in claim 1, wherein in the step 3), the corrugation of the corrugated roll is a sine/cosine curve, the ratio of corrugated height H to corrugated width B is 1:1-1:10, and the corrugated height H is not more than 10 mm.

6. The corrugated-flat rolling composite method of a steel/aluminum/aluminum alloy laminated composite plate as claimed in claim 5, wherein the rolling reduction is not less than 1 H in the step 3).

7. The corrugated-flat rolling composite method of a steel/aluminum/aluminum alloy laminated composite plate as claimed in claim 1, wherein the following steps are performed before the stacking of the aluminum alloy plate and the steel/aluminum laminated composite plate in the step 4): allowing the corrugated surface of the aluminum side of the steel/aluminum laminated composite plate and the aluminum alloy plate to be subjected to surface treatment; removing oil stain and oxidation film on the corrugated surface of the aluminum side of the steel/aluminum laminated composite plate, then grinding, letting stand and drying; removing oil stain and oxidation film on the surface to be bonded of the aluminum alloy plate, then grinding, letting stand and drying.

8. The corrugated-flat rolling composite method of a steel/aluminum/aluminum alloy laminated composite plate as claimed in claim 1, wherein in the step 4), the designation of the aluminum alloy is any one of 3-series, 5-series or 6-series aluminum alloys, with a thickness of 4-100 mm.

9. The corrugated-flat rolling composite method of a steel/aluminum/aluminum alloy laminated composite plate as claimed in claim 1, wherein the heating temperature is 450-600° C. and the rolling reduction is not less than 40% in the step 5).

10. The corrugated-flat rolling composite method of a steel/aluminum/aluminum alloy laminated composite plate as claimed in claim 1, wherein the steel/aluminum/aluminum alloy laminated composite plate prepared in the step 5) is a high-performance composite plate with a mechanically engaged and metallurgically bonded corrugated interface.

\* \* \* \* \*